Nov. 4, 1941. T. F. ROSING ET AL 2,261,632
ELECTRIC CIRCUIT CONTROL MECHANISM
Filed May 4, 1939 3 Sheets-Sheet 1

Inventors
Theodore F. Rosing
William C. Stevens
By Frank H. Hubbard
Attorney

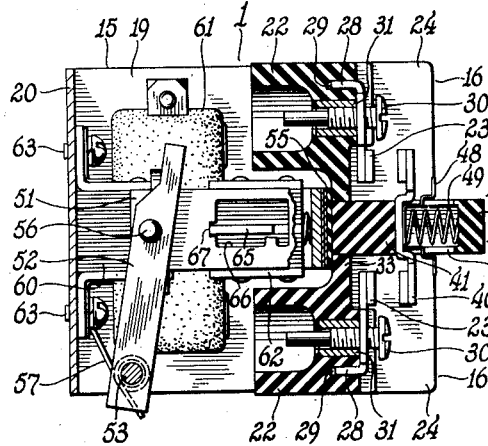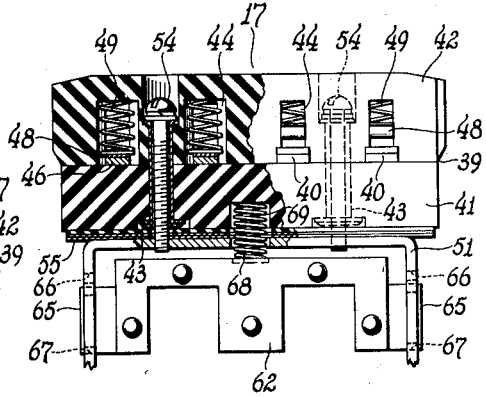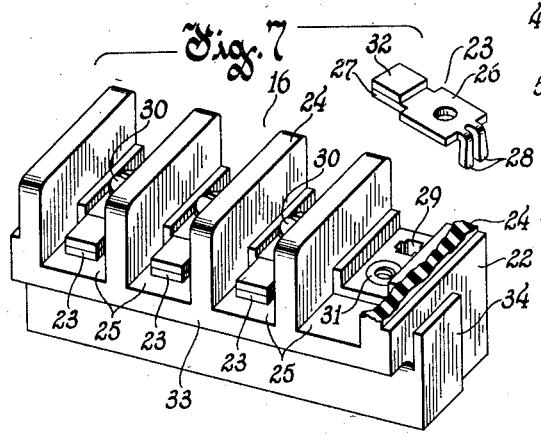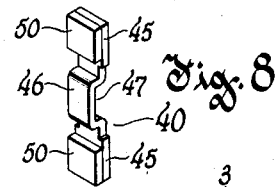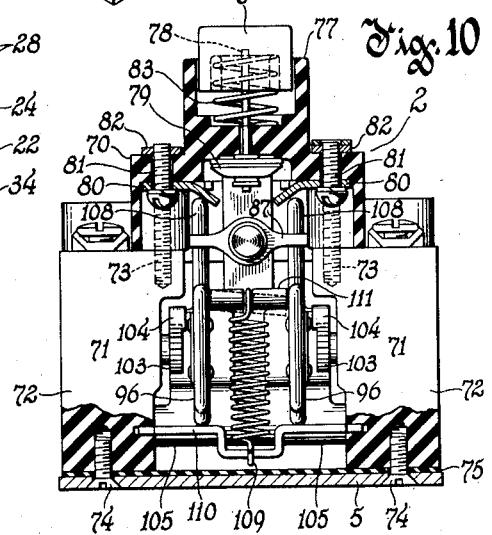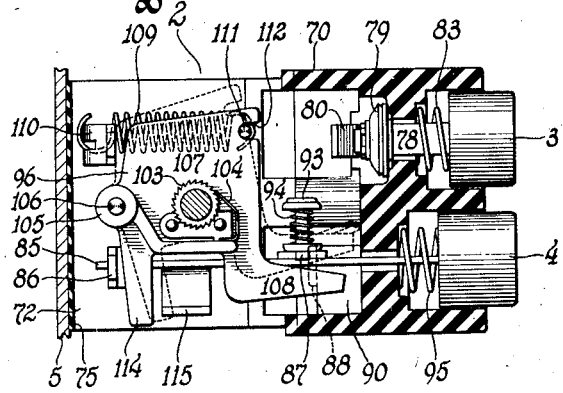

Nov. 4, 1941. T. F. ROSING ET AL 2,261,632
ELECTRIC CIRCUIT CONTROL MECHANISM
Filed May 4, 1939 3 Sheets-Sheet 3

Inventors.
Theodore F. Rosing
William C. Stevens
By Frank H. Hubbard
Attorney

Patented Nov. 4, 1941

2,261,632

UNITED STATES PATENT OFFICE 2,261,632

ELECTRIC CIRCUIT CONTROL MECHANISM

Theodore F. Rosing, Whitefish Bay, and William C. Stevens, Milwaukee, Wis., assignors to Cutler-Hammer, Inc., Milwaukee, Wis., a corporation of Delaware Application May 4, 1939, Serial No. 271,731

20 Claims. (Cl. 175—375)

This invention relates to electric circuit control mechanisms and is particularly applicable to push button controlled electromagnetic starters for polyphase alternating current motors.

The invention has among its objects to improve the construction and operation of starters of the aforesaid type.

Another object is to provide a more rugged, compact and efficient electromagnetic line switch unit for starters of the aforesaid character.

Another object is to provide an improved control unit for motor starters and the like including a push button operated start switch and a push button operated stop switch, the latter being also operable automatically for stopping by an overload responsive mechanism.

Another object is to provide a line switch construction advantageous also for manual starters.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

Figure 1:
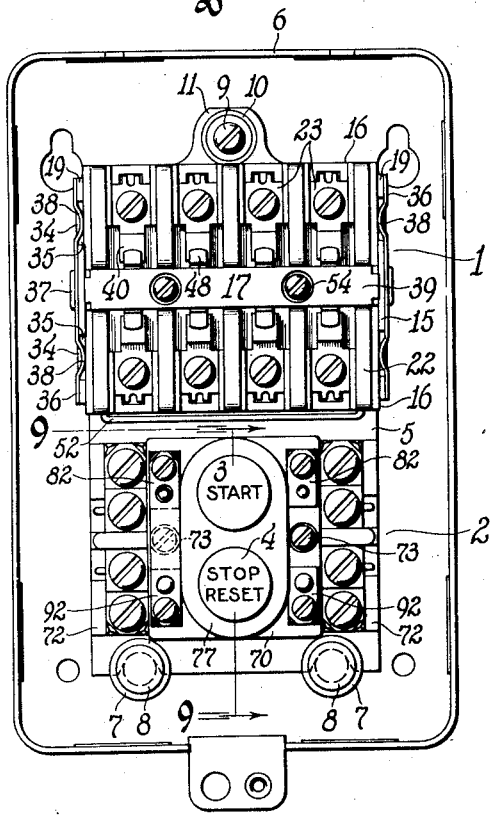
Figure 1 is a front elevational view of an enclosed starter embodying the invention, a cover for the enclosing casing being removed.
Figure 2:
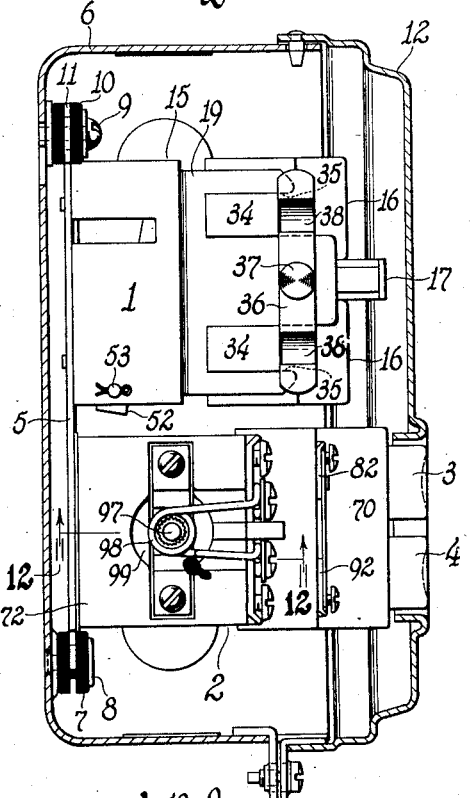
Fig. 2 is a side elevational view of the starter shown in Fig. 1, the enclosing casing and its associated cover being shown in section.
Figure 3:
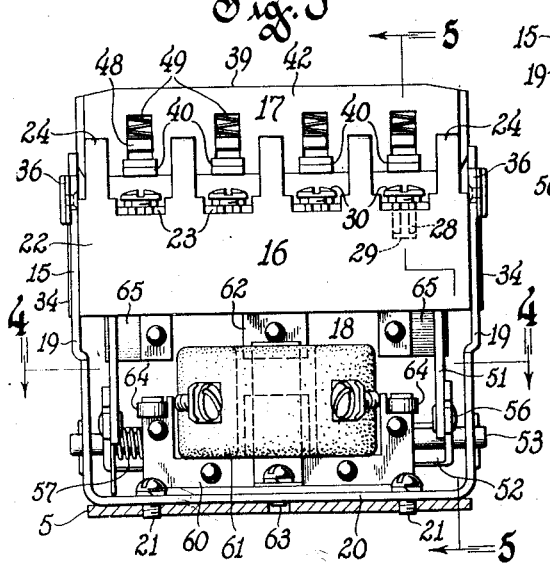
Fig. 3 is a top plan view of the electromagnetic switch unit shown in Fig. 1.
Figure 4:
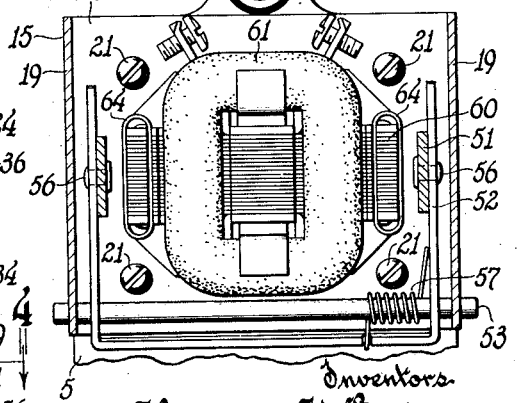
Figure 11:
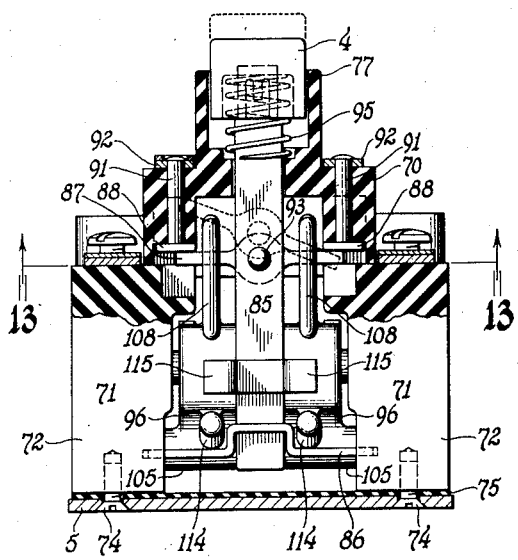
Figure 12:
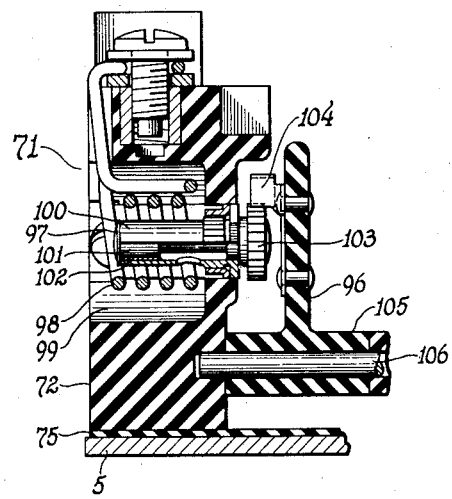
Figure 13:
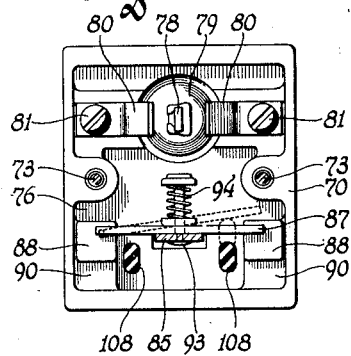

Figs. 4 and 5 are sectional views on lines 4—4 and 5—5, respectively, of Fig. 3;

Fig. 6 is a bottom elevational view, partly in section, of the movable contact assembly shown in Fig. 1;

Fig. 7 is a perspective view of one of the stationary contact assemblies employed in the switch shown in Fig. 1, one of the contacts of the assembly being removed;

Fig. 8 is a perspective view of one of the bridging contacts employed in the movable contact assembly shown in Fig. 6;

Fig. 9 is a vertical sectional view of the push button control unit shown in Fig. 1, the section being on line 9—9 of Fig. 1;

Fig. 10 is a top view, partly in section, of the push button control unit shown in Fig. 9;

Fig. 11 is a bottom view, partly in section, of the push button control unit shown in Fig. 9;

Fig. 12 is a sectional view taken substantially on line 12—12 of Fig. 2;

Fig. 13 is a view on line 13—13 of Fig. 11, and

Figure 14:
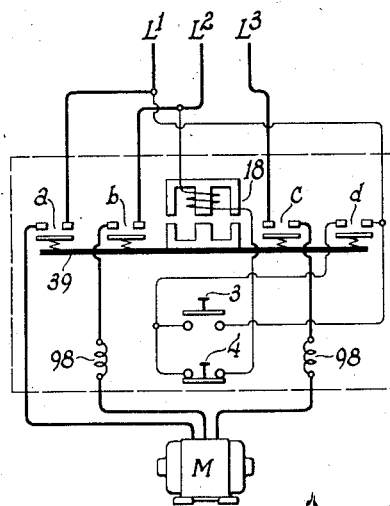

Fig. 14 is a diagrammatic view illustrating the circuit connections for the starter shown in Fig. 1.

Referring to Fig. 1, the same illustrates a push button controlled starter for polyphase alternating current motors including an electromagnetically operated switch unit 1 and a control unit 2 therefor including a start push button 3 and a combined stop and reset push button 4. Said units are both mounted upon the front face of a vertically arranged metal plate 5 which is removably secured to the rear wall of a box-shaped enclosing casing 6. The lower edge of plate 5 is provided with recessed portions which are supported upon a pair of spool-shaped cushioning members 7 secured to the rear wall of casing 6 by rivets 8 and said plate is secured to the rear wall of said casing by a screw 9 which extends through a spool-shaped cushioning member 10 held within an opening in a projection 11 on the upper end of said plate. Casing 6 is provided with a removable front cover 12 having an opening therein for receiving push buttons 3 and 4.

Switch unit 1 is provided with a single supporting bracket 15 which carries all of the switch parts, such parts including a pair of stationary contact assemblies 16—16, a movable contact assembly 17 and an operating magnet 18. Bracket 15 comprises a sheet metal stamping having spaced side arms 19—19 and a rear wall 20 which is secured to plate 5 by screws 21 shown in Fig. 4.

The stationary contact assemblies are of like construction, each comprising an elongated molded insulating base 22 having a plurality of stationary contacts 23 detachably mounted thereon. As shown in Fig. 7, the front face of insulating base 22 is provided with five horizontally spaced forwardly extending parallel shields 24 and the contacts 23 are mounted in channels 25 formed in the spaces between said shields. Each of the contacts 23 comprises a sheet metal stamping formed to provide a rectangular terminal portion 26 having a contact projection 27 on one end thereof and a pair of rearwardly extending prong projections 28 on the opposite end thereof. The contacts 23 are detachably secured to insulating base 22 by engagement of their associated prongs 28 within recesses 29 in the front face of said base, said recesses being horizontally aligned and located adjacent one side of said base. The terminal portion of each contact is provided with an opening for receiving a binding screw 30 which threads into an insert 31 molded into base 22, and each contact has a silver contact tip 32 attached to its associated contact projection 27. Insulating base 22 is formed to provide a ledge 33 on the side adjacent contact tips 32 and the end faces of said base are each provided with a rectangular projection 34.

The two contact assemblies 16 are mounted between the side arms 19 of bracket 15, the insulating bases 22 thereof being vertically spaced and arranged in opposed relation, as shown in Fig. 5. Insulating bases 22 are held in assembled position upon bracket 15 by engagement of their associated end projections 34 within slots 35 in the side arms 19, and as shown in Fig. 2 the front ends of said slots are open to permit removal of said bases from the front of said bracket. Each of the side arms 19 has a spring clip 36 associated therewith, and as shown in Figs. 1 and 2 each of said spring clips is secured intermediate its ends to its associated side arm 19 by a rivet 37 and each is provided with indented end portions 38 which project into the slots 35 of its associated arm. As is apparent from Figs. 1 and 2, the spring clips 36 engage the front edges of projections 34 on insulating bases 22 to lock said bases against play in bracket 15. However, clips 36 are rotatable upon their associated rivets 37 whereby the same may be sprung out of engagement with projections 34 to permit removal of insulating bases 22 from bracket 15.

Movable contact assembly 17 includes an elongated flat insulating support 39 which is slidably supported between insulating bases 22 and carries a plurality of bridging contacts 40, each of which cooperates with a pair of vertically aligned stationary contacts 23. Insulating support 39 is provided with a rear section 41 and a front section 42, said sections being secured together as shown in Fig. 6 by hollow rivets 43. Bridging contacts 40 are mounted in slots 44 in the rear face of section 42. Said contacts are of like construction, each being provided with end contact portions 45 and a connecting shank 46 which is of reduced width and is slidably supported within its associated slot 44. The contact portions 45 are offset with respect to shank 46 to provide a channel 47 in the front face of the contact, and said contact portions have silver tips 50 attached to the rear faces thereof.

Each of the contacts 40 has a U-shaped locking member 48 associated therewith which engages within the channel 47 in the front face thereof. Said locking members are slidably mounted within the slots 44 in insulating section 42 and are biased inwardly by springs 49 held under compression within said slots.

Springs 49 act to normally hold bridging contacts 40 in engagement with the front face of insulating section 41, as shown in Fig. 5. As is apparent, bridging contacts 40 are movable away from insulating section 41 against the action of their associated springs 49 and said contacts are then capable of a universal or rocking movement upon the inner ends of their associated springs to permit alignment thereof with their cooperating stationary contacts 23.

The bridging contacts 40 are readily removable from insulating support 39. To effect removal of a bridging contact the locking member 48 associated therewith is moved outwardly against the action of spring 49 into a position wherein the same clears the shank portion 46 of the contact. With locking member 48 held in released position the contact is rotated into a position wherein the enlarged contact portions 45 thereof clear the sides of its associated slot 44 and the contact is then removable from said slot by moving the same longitudinally.

The above described movable contact assembly is provided with a U-shaped bracket 51 which is mounted upon the rear face of insulating support 39 and connected to a U-shaped lever 52 which is rotatably mounted upon a pin 53 supported within openings in the side arms 19 of bracket 15. As shown in Fig. 6, bracket 51 is secured to insulating support 39 by screws 54 extending through the hollow rivets 43, and a plurality of removable shims 55 are interposed between said bracket and the rear face of said support. As shown in Fig. 5, the shims 55 project on opposite sides of insulating support 39 to provide shoulders which cooperate with the ledges 33 on insulating bases 22 to limit outward movement of the movable contact assembly 17 beyond the position shown in Fig. 5.

The side arms of bracket 51 are pivotally connected to the side arms of lever 52 by rivets 56 and said lever is biased to yieldingly maintain the movable contact assembly 17 in the position shown in Fig. 5 by a spring 57. As shown in Fig. 4, spring 57 is coiled around the pivot pin 53 and one end thereof bears against the rear wall 20 of bracket 15, while the opposite end thereof bears against the upper surface of the connecting portion of lever 52.

Magnet 18 provides for movement of contact assembly 17 inwardly out of the position shown in Fig. 5 to effect engagement of bridging contacts 40 with their associated stationary contacts 23. As shown in Fig. 3, operating magnet 18 is arranged between the side arms of bracket 51 and the same includes a stationary E-shaped laminated magnet frame 60, an operating winding 61 mounted upon the middle leg of said magnet frame, and an E-shaped laminated armature member 62. Magnet frame 60 is secured to the rear wall 20 of bracket 15 by screws 63 and the outer pole faces of said magnet frame are recessed to receive shading coils 64. As shown in Fig. 6, armature member 62 is provided with narrow end projections 65—65 which extend into openings 66 in the side arms of bracket 51. The openings 66 in bracket 51 are shaped as shown in Fig. 5, the same being notched as shown at 67 to receive the inner edges of projections 65. Armature member 62 is held in assembled position upon bracket 51 by a spring 68. As shown in Fig. 6, the outer face of armature 62 is recessed to receive the inner end of spring 68 and said spring extends outwardly through openings in the shims 55 and is held under compression within a recess 69 in the inner face of insulating section 41.

As is apparent from the foregoing, armature member 62 is attracted inwardly upon energization of winding 61 and during movement thereof into its attached position the same acts directly upon the movable contact assembly 17 to move the same into circuit closed position. It should be noted that the spring 68 permits rocking movement of the armature 62 with respect to bracket 51 whereby said armature member is free to assume a position wherein the pole faces thereof align with the pole faces of the magnet frame 60. It should also be noted that armature member 62 has end play in bracket 51 to enable it to be readily inserted and removed, the spring 68 serving to hold it in centered position and hence against accidental displacement.

As hereinbefore stated, the switch unit 1 is provided with a control unit 2 including a start push button 3 and a combined stop and reset button 4. Said control unit includes a rectangular insulating base 70 which carries said push buttons and contacts associated therewith and said unit also includes two overload responsive devices 71—71 each including a rectangular insulating base 72. Insulating bases 72 are spaced as shown in Fig. 10 and base 70 bridges the front faces of bases 72 and is secured thereto by screws 73. Also as shown in Fig. 10 the insulating bases 72 are secured to the front face of plate 5 by screws 74, an insulating sheet 75 being interposed between the same and said plate.

The rear face of insulating base 70 is recessed as shown at 76 (Fig. 13) to receive contacts associated with push buttons 3 and 4 and the front face thereof is provided with a projection 77 (Fig. 10) having recesses therein for receiving said push buttons. Push button 3 has a stem 78 fixed thereto which extends inwardly through an opening in base 70 and has a bridging contact 79 mounted upon the inner end thereof. Bridging contact 79 cooperates with a pair of stationary contacts 80—80 which are secured within recess 76 by screws 81 threaded into terminal plates 82—82 mounted on the front face of base 70. Push button 3 and its associated bridging contact 79 are normally held in the position shown in Fig. 10 by a spring 83 and upon inward movement of push button 3, bridging contact 79 is moved into engagement with its associated contacts 80 to establish circuit between the terminal plates 82.

As shown in Figs. 9 and 11, the combined stop and reset button 4 has an elongated flat stem 85 fixed thereto which extends inwardly through an opening in base 70 and has its inner end supported within a recess in a bar 86 supported at opposite ends within openings in the opposed faces of insulating bases 72. As shown in Figs. 11 and 13, stem 85 carries a bridging contact 87 which cooperates with a pair of stationary contacts 88—88 mounted upon projections 90 formed on opposite sides of recess 76 in the rear face of insulating base 70. Stationary contacts 88 are secured to the rear faces of projections 90 by rivets 91 which also serve to secure a pair of terminal plates 92—92 to the front face of insulating base 70. Bridging contact 87 is loosely pivoted intermediate its ends upon a pin 93 fixed to stem 85 and said bridging contact is normally held parallel to and in engagement with the top face of stem 85, as shown in full lines in Fig. 13 by a spring 94. Push button 4 has a spring 95 associated therewith for biasing the same outwardly with respect to base 70 and as shown in Figs. 11 and 13 bridging contact 87 is normally positioned to engage its associated stationary contacts 88 and is held in engagement therewith under the action of spring 95 to establish circuit between the terminal plates 92. As is apparent, bridging contact 87 is movable inwardly by its associated push button 4 to disengage the same from stationary contacts 88 subject to reengagement upon release of said push button.

Bridging contact 87 may be tilted with respect to stem 85 against the action of spring 94 to permit disengagement of either end thereof from its associated stationary contact 88. The overload responsive devices 71 are associated with opposite ends of bridging contact 87 and as hereinafter set forth either of the same is adapted upon overload conditions to effect tilting of said bridging contact for interruption of circuit between stationary contacts 88.

Each of the overload devices 71 includes a switch tripping member 96 which is associated with an overload responsive element 97 of the self-soldering type. As shown in Fig. 12 each of the overload responsive elements 97 includes a heater 98 of helical form arranged within a recess 99 in one side of its associated insulating base 72, a tubular member 100 surrounded by said heater and fixed within an opening in said base and a pin 101 located within said tubular member and normally held against rotation with respect thereto by a solder connection 102. Each of the heaters 98 is connected to a pair of terminal plates mounted upon the front face of its associated base 72 and each of the pins 101 has a ratchet wheel 103 fixed to the inner end thereof to be engaged by a spring latch 104 fixed to its associated switch tripping member 96.

The switch tripping members 96 are preferably formed of molded insulation and are provided with elongated hub portions 105 which are rotatably mounted upon a pin 106 supported at opposite ends within openings in the inner faces of insulating bases 72. The switch tripping members 96 are each provided with a forwardly extending portion 107 having a projecting finger 108 on the front end thereof. As shown in Figs. 11 and 13 fingers 108 underlie bridging contact 87 and are located on opposite sides of pivot pin 93. Both of the tripping members 96 are biased to move upwardly under the action of a spring 109. One end of spring 109 is connected to a bar 110 which is supported at opposite ends within recesses in the inner faces of insulating bases 72 and the opposite end of said spring is connected to a pin 111 which is supported at opposite ends within notches 112 formed in the forwardly extending portions 107 of switch tripping members 96.

Switch tripping members 96 are each normally held in a retracted position against the action of spring 109 by engagement of their associated spring latches 104 with ratchet wheels 103 of overload responsive elements 97. With tripping members 96 in retracted position the fingers 108 thereof are positioned as shown in Figs. 9 and 13, the same being out of engagement with bridging contact 87. Each of the overload responsive elements 97 acts upon given overload current conditions in its associated heater 98 to release its associated tripping member 96, and said tripping members when released are rotated upwardly by spring 109. Upon upward movement of either of the switch tripping members 96 out of its retracted position the finger 108 associated therewith raises one end of bridging contact 87 to disengage the same from its associated stationary contact 88. Push button 4 and stem 85 are then moved outwardly with a snap action by spring 95 and the disengaged end of bridging contact 87 is moved forwardly upon finger 108 of the released tripping member 96 and away from its associated stationary contact 88. The switch parts then assume the position shown in dotted lines in Fig. 11, the bridging contact 87 being rocked upon its pivot pin 93 so that one end thereof engages the face of recess 76 in base 70 while the opposite end thereof remains in engagement with its associated stationary contact 88. In connection with the foregoing it should be noted that push button 4 is moved outwardly from normal position into the dotted line position shown in Fig. 11 to thereby indicate tripping of the overload responsive devices.

Each of the switch tripping members 96 is provided with a downwardly extending lug 114 and the stem 85 of push button 4 has projections 115 on opposite sides thereof which are arranged in front of said lugs. As is apparent, upon inward movement of push button 4 out of the dotted line position shown in Fig. 11 the lug 114 on the released tripping member 96 is moved inwardly by one of the projections 115 on stem 85 and the released tripping member is thus reset in its retracted position. Upon resetting operation of push button 4 bridging contact 87 is moved inwardly beyond its associated stationary contacts 88 without engagement therewith. During such inward movement of bridging contact 87 the same is returned to a position substantially at right angles to stem 85 by engagement with the front edges of portions 107 on tripping members 96. Also upon resetting of the tripping members 96 said bridging contact is returned to the full line position shown in Fig. 13 by spring 94. Thus upon release of push button 4 after a resetting operation bridging contact 87 is moved into engagement with its associated stationary contacts 88.

The above described control device may be used as shown in Fig. 14 to control a three-phase alternating current motor M. Three poles of switch unit 1 designated by reference characters $a$, $b$ and $c$ are arranged to connect motor M to a supply circuit indicated by lines $L^1$, $L^2$ and $L^3$, and the pole $d$ of said switch unit is connected in a maintaining circuit for the operating winding of magnet 18. The heater coils 98 are each connected in one of the supply conductors of motor M and the contacts associated with start push button 3 and stop push button 4 are connected in series with the operating winding of magnet 18. Upon depression of start push button 3 the operating winding of magnet 18 is energized by a circuit extending from line $L^1$ through the contacts of start button 3, through the contacts of stop button 4 and through the operating winding of magnet 18 to line $L^2$. Switch unit 1 is thus moved into circuit closing position and as is apparent motor M is then connected directly across the supply circuit indicated by lines $L^1$, $L^2$ and $L^3$. Upon release of start button 3 the operating winding of magnet 18 is maintained energized by a circuit extending from line $L^1$ through pole $d$ of switch unit 1 through the contacts of stop button 4 and through the operating winding of magnet 18 to line $L^2$. Upon depression of stop button 4 the maintaining circuit for magnet 18 is interrupted to effect opening of switch unit 1. Switch unit 1 is also opened under given overload conditions, the maintaining circuit therefor being interrupted by operation of the overload devices associated with the movable contact of stop button 4.

What we claim as new and desire to secure by Letters Patent is:

1. In a circuit controller, in combination, a support having a vertically disposed part, stationary contact carriers mounted on said support in a spaced relation one to another, a contact carrier reciprocable between said stationary contact carriers toward and away from said vertical part of said support, cooperating contacts on said carriers having their contact surfaces disposed vertically, and an operating electromagnet for said reciprocable carrier mounted between the vertical part of said support and said reciprocable carrier axially in substantial alignment with the latter.

2. In a circuit controller, in combination in the form of a self-contained unit, a frame having a vertically disposed part, stationary contact carriers mounted on said frame in a spaced relation one to another, a contact carrier reciprocable between said stationary contact carriers toward and away from said vertical part of said frame, cooperating contacts on said carriers having their contact surfaces disposed vertically, and an operating electromagnet for said reciprocable carrier comprising a core part and winding mounted on said vertical part of said frame substantially in alignment with said reciprocable carrier and an armature attached to said reciprocable carrier.

3. In a circuit controller, in combination, a vertically disposed support and two units attached to said support in close proximity one to the other, one of said units comprising an electromagnetic switch having its cooperating contact faces vertically disposed, having a movable contact carrier reciprocable in a substantially straight line substantially perpendicularly of said support and having its electromagnet arranged perpendicularly to said support between said support and said movable contact carrier and axially in substantial alignment with the latter and the other of said units comprising push button and thermal type overload control means for said electromagnetic switch.

4. In a circuit controller, in combination, an electromagnetic switch in the form of a self-contained unit, push button and thermal overload control means for said switch in the form of a second self-contained unit, a common supporting plate for said units to which said units are separately attached, an enclosure for said units having a vertical part, said plate carrying said units having means affording mounting thereof on said vertical part of said casing and affording ready removability therefor, said switch unit having its contact faces vertically disposed, having a movable contact carrier reciprocable toward and away from said plate and having its electromagnet disposed between said movable contact carrier and said plate with its axis disposed perpendicularly to said plate and substantially in alignment with said movable contact carrier.

5. In a circuit controller, in combination, a support having a part to be disposed vertically, stationary contact carriers mounted on said support, one above the other in a spaced relation, a movable contact carrier reciprocable between said stationary contact carriers toward and away from said vertical part of said support, cooperating contacts mounted on said movable and stationary carriers with their contact surfaces disposed parallel to said vertical part of said support, and operating means for said movable contact carrier connected thereto at the rear thereof.

6. In a circuit controller, in combination as an assembly, a frame having an intermediate part and parts projecting therefrom outwardly, insulating blocks supported at their ends in said outwardly projecting parts of said frame one above another in a parallel relation to said intermediate part of said frame, a member reciprocable between said blocks toward and away from said intermediate part of said frame, contacts on said blocks and cooperating bridging contacts on said reciprocating member, said contacts having their coacting faces vertically disposed.

7. In a circuit controller, in combination as an assembly, a frame comprising an intermediate part and parts projecting outwardly therefrom and each provided with spaced open slots one above another, insulating blocks having reduced end portions insertable into said slots for support of said blocks by said frame one above another in a parallel relation to said intermediate part of said frame, an insulating member reciprocable between said blocks toward and away from the intermediate part of said frame, contacts on said blocks and cooperating bridging contacts on said reciprocating member, said contacts having their coacting faces vertically disposed.

8. In a circuit controller, in combination as an assembly, a frame having an intermediate part and parts projecting outwardly from said intermediate part, insulating blocks supported at their ends in said frame one above another in a parallel relation to said intermediate part of said frame, contacts carried by said blocks and having vertically disposed contact surfaces, an insulating member reciprocable between said contacts toward and away from said intermediate part of said frame, contacts carried by said reciprocable member to bridge contacts on said blocks, and a lever mechanism pivotally mounted upon said frame and pivotally connected to said reciprocable member for maintaining the latter in parallel relation to said intermediate part of said frame during movement toward and away from said intermediate part.

9. In a circuit controller, in combination as an assembly, a pair of insulating blocks, supporting means for said blocks supporting them at their extremities and in a spaced relation one above another, terminals and contacts carried by said blocks on vertically disposed faces thereof, contacts for bridging the aforementioned contacts and a carrier for said bridging contacts supported between said blocks and reciprocable to engage said bridging contacts with and to disengage the same from said first mentioned contacts, each of said bridging contacts having freedom to rock in any direction relative to said carrier and having biasing means yieldingly to hold it in a given relation to said carrier.

10. In a circuit controller, in combination as an assembly, a pair of insulating blocks, a supporting frame for said blocks supporting them at their extremities and in a spaced relation one above another, vertically disposed terminals and contacts carried by said blocks, contacts for bridging the aforementioned contacts and a carrier for said bridging contacts supported between said blocks and reciprocable to engage said bridging contacts with and to disengage the same from said first mentioned contacts, each of said bridging contacts having freedom to rock in any direction relative to said carrier and having biasing means yieldingly to hold it in a given relation to said carrier and each of said bridging contacts being removable endwise from said carrier when adjusted against its biasing means into a given relation to said carrier.

11. In a circuit controller, in combination, cooperating stationary and movable contacts, a carrier for certain of said movable contacts reciprocable in a substantially straight line, means biasing said carrier in one direction and an electromagnet for moving said carrier in a reverse direction, said electromagnet comprising a magnetic core having a fixed position in substantial alignment with said carrier and a movable armature, said carrier having projections supporting said armature at its ends and permitting longitudinal and transverse play of said armature.

12. In a circuit controller, in combination, cooperating stationary and movable contacts, a carrier for certain of said movable contacts reciprocable in a substantially straight line, means biasing said carrier in one direction and an electromagnet for moving said carrier in a reverse direction, said electromagnet comprising a magnetic core having a fixed position in substantial alignment with said carrier and a movable armature, said carrier having projections supporting said armature at its ends and permitting longitudinal and transverse play of said armature, and said carrier being provided with spring means resisting such play of said armature.

13. In a circuit controller, in combination, an electromagnetic switch to control an electric circuit, a manual control device comprising normally open and normally closed switches respectively to energize and deenergize said electromagnetic switch at will, said normally closed switch having biasing means and a finger operated actuator and having one opening movement to be effected by said actuator and a second opening movement differing from the former, and means responsive to predetermined electrical conditions in the circuit controlled by said electromagnetic switch to effect said second opening movement of said normally closed switch and retention thereof in open position subject to reclosure through the medium of said finger operated actuator.

14. In a circuit controller, in combination, an electromagnetic switch to control an electric circuit, a manual control device comprising normally open and normally closed switches respectively to energize and deenergize said electromagnetic switch at will, said normally closed switch having biasing means and a finger operated actuator and having one opening movement to be effected by said actuator and a second opening movement differing from the former, and means responsive to predetermined electrical conditions in the circuit controlled by said electromagnetic switch to effect said second opening movement of said normally closed switch and retention thereof in open position subject to reclosure through the medium of said finger operated actuator, said actuator upon opening of said normally closed switch by said means assuming a position indicative of response of said means.

15. In a circuit controller, in combination, a switch to be normally closed, biasing means yieldingly holding said switch in closed position, a finger operated actuator to move said switch to an open position from which it is returnable to closed position by said biasing means, and a device associated with said switch to effect a distinctive opening movement of said switch to an open position from which it is returnable to closed position only upon a given manual movement of said actuator.

16. In a circuit controller, in combination, a switch to be normally closed, biasing means yieldingly holding said switch in closed position, a finger operated actuator to move said switch to an open position from which it is returnable to closed position by said biasing means, and a device associated with said switch to effect a distinctive opening movement of said switch to an open position from which it is returnable to closed position only upon a given manual movement of said actuator, opening of said switch by said device effecting positioning of said actuator indicative of action of said device.

17. In a circuit controller, in combination, a switch to be normally closed, biasing means yieldingly to hold said switch in closed position, a finger operated actuator to move said switch to an open position from which it is returnable to closed position by said biasing means, a device associated with said switch to effect opening movement of said switch assisted by said biasing means which then retains said switch in open position subject to return to closed position through operation of said actuator.

18. In a circuit controller, in combination, a switch to be normally closed, biasing means yieldingly to hold said switch in closed position, a finger operated actuator to move said switch to an open position from which it is returnable to closed position by said biasing means, a device associated with said switch to effect opening movement of said switch assisted by said biasing means which then retains said switch in open position subject to return to closed position through operation of said actuator, said device being resettable by said actuator when operated for reclosure of said switch.

19. In a circuit controller, in combination, stationary contacts, a bridging contact therefor, means biasing said bridging contact into engagement with said stationary contacts, a manually operated element to move said bridging contact out of engagement with said stationary contacts against the action of said biasing means and a device associated with said bridging contact to tilt the same for disengagement from one of said stationary contacts, said biasing means then acting on said bridging contact to move it to a full open position with a snap action.

20. In a circuit controller, in combination, stationary contacts, a bridging contact therefor, means biasing said bridging contact into engagement with said stationary contacts, a manually operated element to move said bridging contact out of engagement with said stationary contacts against the action of said biasing means and a device associated with said bridging contact to tilt the same to disengage one of said stationary contacts, said biasing means then acting on said bridging contact to move it to a full open position with a snap action, said bridging contact when in the last mentioned full open position being returnable to closed position through the medium of said manual actuator, and the same motion of said manual actuator resetting said device.

THEODORE F. ROSING.
WILLIAM C. STEVENS.

CERTIFICATE OF CORRECTION.

Patent No. 2,261,632.  November 4, 1941.

THEODORE F. ROSING, ET AL.

It is hereby certified that error appears in the printed specification of the above numbered patent requiring correction as follows: Page 2, second column, line 62, for "attached" read --attracted--; and line 64, for "closed" read --closing--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.